3,118,782
CALCIUM CARBONATE CONTAINING COATING COMPOSITION AND TRANSFER COATING RECEPTIVE PAPER COATED THEREWITH
William H. Hoge, Rumford, and Marshall S. Barbour, Livermore, Maine, assignors to Oxford Paper Company, a corporation of Maine
No Drawing. Filed Jan. 3, 1961, Ser. No. 79,980
18 Claims. (Cl. 117—35.6)

This invention relates to coating compositions and coated papers having improved image receptivity for transfer coatings such as those employed in conventional carbon papers. More particularly, the invention relates to an improved carbon image receptor coating containing calcium carbonate and an adhesive which is applied to the paper in the form of a liquid dispersion in which the calcium carbonate has been dispersed to a degree that it possesses a relative sedimentation volume of between about 2 and 6.

The following symbolic diagram illustrates an embodiment of the invention

---
Coating of adhesive + CaCO₃ using CaCO₃ dispersion of RSV between about 2 and 6
---
Paper base
---

The term RSV is used as an abbreviation for relative sedimentation volume.

Different types of papers have been prepared and are commercially available which have adhered thereto a transfer coating containing a pigment or dye. Upon application of pressure by a pencil, typewriter key, and so forth on the coating, the coating is transferred in the pressure impact area to another surface in contact with the transfer coating such as a sheet of paper. This type of paper is generally referred to in the art as carbon paper since the pigment most commonly used in the transfer coating is carbon.

The type of image which can be transferred from such papers will depend not only upon the particular transfer coating adhered thereto but also upon the receptor surface or the particular type of paper to which it is to be transferred. The receptor coating, or receptor paper, of this invention results in the transfer of clearer and sharper images from various types of commercial transfer or carbon papers including those transfer coatings composed of wax and synthetic plastic or plastisol bases containing various types of pigments and dyes such as carbon pigment and aniline dyes commonly used in such transfer coatings. The clearness and sharpness of the images transferred to the receptor coating or receptor paper of this invention will depend somewhat upon the particular transfer coating being transferred to the receptor surface. In some cases, where the transfer coating is a conventional wax-based carbon pigment coating, the improvement is quite striking in the first copy over other copy papers available or on the market, while the improvement in the clearness and sharpness of the image on the first copy is not as striking with plastisol-based transfer coatings or with transfer coatings containing fusion carbon. In all cases, however, the improvement in image transfer is very noticeable when producing multiple copies beginning especially with about the seventh copy.

The coatings of this invention can be applied to different papers to improve the image receptivity of transfer coatings and especially with respect to commercial grades of paper which in the past have had unacceptable or marginally acceptable characteristics. The coatings, for example, when applied to registered bond paper greatly improve its receptivity to transfer coatings. The type of base paper to which the coating can be applied can thus vary quite widely and can generally be applied to any base paper, paperboard, or cardboard where it is desired to improve the transfer coating image receptivity.

As stated above, the receptor coatings and receptor papers of this invention can be used with various papers having a transfer coating adhered thereto. The bases of the transfer coatings can vary quite widely and can include wax bases such as Japan, paraffin, and carnauba waxes, as well as oil-based transfer coatings such as olein and resin. The transfer coating base can also be a synthetic resin or plastisol. The color of the transfer coating can also be varied and can include pigments such as carbon as well as aniline dyes such as methyl violet, crystal violet, malachite green, and the like.

The invention further includes the discovery that the receptor sheet as herein disclosed can also be used as an improved hectograph master sheet in hectographic duplicating processes. The invention thus also includes an improved hectograph master sheet. In using the coated papers of this invention as a hectograph master sheet, the master sheet is prepared by typing or writing on the master sheet paper backed with the special hectograph carbon or transfer paper. During the typing or the writing of the master sheet the back side of the sheet receives a reverse image from the special hectograph transfer or carbon paper. Copies of the image thus formed on the hectograph master sheet are then made by pressing the imaged side of the master sheet against copy papers moistened with a suitable liquid as known in the art. The use of master sheets made according to this invention with the calcium carbonate dispersed composition herein disclosed results in hectographic copies of improved image quality. The special hectograph transfer coatings or carbon papers as well as the liquids with which the copy papers can be moistened are well known in the art and need not be described in detail herein. Generally, however, hectograph transfer coatings are composed of a wax or a suitable adhesive and a spirit-soluble dyestuff such as methyl violet. The solution used to dampen the copy papers can be alcohol. In addition, the coating composition of the present invention may be applied to translucent master sheet paper in the manufacture of improved hectograpphic master sheets. The use of translucent master sheet paper makes unnecessary marking of the master sheet face with the typewritten ribbon. The interposition of a cloth typewriter ribbon between the typewriter key and the master sheet paper reduces the sharpness of the impression made by the key and consequently reduces the sharpness of the image received on the back of the master sheet. When opaque master sheets are used the typist must use the typewriter ribbon to create ink letters on the face of the master sheet in order for him to gage the progress and accuracy of his typing. The use of translucent master sheet paper obviates the ink marking of the master sheet face since the typist can see the transfer images as they are formed on back of the master sheet.

Translucent papers are also used in the production of masters in certain duplicating processes such as Ozalid, a trademark of the General Aniline & Film Corporation, and Copyflex, a trademark of the Charles Bruning Company, Inc. In the Ozalid and Copyflex processes, for example, masters are produced by placing translucent papers and a suitable carbon paper against one another and transferring images from the carbon paper to the translucent paper by typing or other pressure marking. Translucent papers coated with the composition of the present invention have improved image receptive qualities.

Receptor papers of this invention may also be used in the preparation of offset planographic printing plates. In the preparation of such plates, images are created on heat sensitive paper by heat transfer means. One such process is Thermo-Fax, a trademark of the Minnesota Mining and Manufacturing Company. These images are then transferred to a receptor paper to create the offset printing plate. Receptor papers coated with the composition of this invention have improved image receptive qualities and thus permit the production of a superior offset printing plate.

The pigment which can be used to produce the receptor coatings and receptor papers of this invention is calcium carbonate. Various types of calcium carbonates can be used as will be appreciated by those skilled in the art including such calcium carbonates as marketed under the trade name "Albacar 5970" by C. K. Williams & Company and "Purecal O" by Wyandotte Chemicals Corporation. Other calcium carbonates can also be used as will be apparent to those skilled in the art. Pigments, such as magnesium carbonate and blanc fixe (barium sulfate), can be mixed in minor proportions with the calcium carbonate. Pigments used in the practice of this invention are composed essentially of calcium carbonate. Other pigments may be added only in limited quantities such that the coating composition retains its excellent receptive qualities.

The extent of pigment dispersion in the liquid coating medium employed is an important and critical feature of the invention. The degree of the dispersion of the pigment solid in the base liquid must be maintained within certain limits to obtain the improved transfer image receptivity of the resulting coating. The limits of the dispersion of the pigment in the base liquid are determined by measuring the relative sedimentation volume of the dispersed pigment. The relative sedimentation volume can be expressed by the following formula:

$$RSV = \frac{\text{sedimentation volume of pigment}}{\text{dry solid pigment volume}}$$

The sedimentation volume is the volume which the pigment occupies when the individual particles are positioned substantially tangent to one another. If the particles tend to adhere to one another and form aggregates and do not work closely the sedimentation volume will be large. If the particles do not tend to adhere to each other the sedimentation volume will be small. The sedimentation volume is determined by dispersing a known weight of pigment particles in the liquid and permitting the pigment particles to settle out of the dispersion by the force of gravity or with the aid of centrifugal force.

The dry solid pigment volume is the volume occupied by that amount of dry, solid pigment equal to the weight of the known amount of pigment added to the dispersion.

The volume of the pigment particles after they have been permitted to settle out of the dispersion by gravity or centrifugal force is measured, and this volume divided by the calculated volume of the same amount of dry, solid pigment to give the relative sedimentation volume of the dispersed pigment. The relative sedimentation volume is thus, in effect, a measure of the degree of pigment dispersion. As the degree of dispersion increases, the relative sedimentation volume value decreases.

The dispersion of the pigment can be accomplished in various known manners such as in a Kady mill, a Cowles dissolver, a Lightnin' mixer, and so forth.

The amount of time and speed required to obtain the desired relative sedimentation volume will be determined by various factors including the type of mixer used, the liquid base in which the pigment is dispersed, the percent of the pigment solids in the liquid base being dispersed, and so forth, as will be apparent to those skilled in the art. Generally as the percent solids being dispersed in the base liquid is increased, the relative sedimentation volume value will be lower, provided other conditions are maintained fairly constant. Pigment dispersion can be produced within the relative sedimentation volumes set forth herein by routine experimentation by those skilled in the art taking into account the various factors discussed above.

Various adhesives can be used with receptor coating compositions according to this invention to secure adhesion of the pigment to the paper base. The particular type adhesive used does not have any significant effect on the receptive properties of the resulting dried coatings. Only slight variations in the effectiveness of the receptivity of the coating can be observed with some adhesives. Among those adhesives which have been found to be usable according to this invention are proteins such as casein, organic thermoplastic polymers and copolymers such as carboxymethyl cellulose, polyvinylidene chloride, polyvinyl acetate, polyvinyl alcohol, polystyrene, starch and modified starches such as chlorinated starch, as well as various other adhesives known to those skilled in the art as acceptable as paper coating adhesives.

Although the particular adhesive used to bind the pigment to the paper surface is not of significance, the amount of adhesive employed is important to the successful practice of this invention. The minimum amount of adhesive required is that amount sufficient to adequately bond the pigment to the paper surface. This minimum amount would of course in turn depend upon the ultimate use of the paper and the strength of adhesion necessary to accomplish the ends desired. It is difficult to set forth and specify figures on the minimum amount of adhesive which might be necessary since this will not only vary with respect to the particular adhesive employed and its adhesive power but will also vary depending upon the particular relative sedimentation volume of the dispersed pigment. Generally, the higher the relative sedimentation volume, the more adhesive would be required to adequately adhere the pigment to a paper surface. Since the cost of the pigment is generally less than the cost of the adhesive, it would of course be advantageous to correlate the relative sedimentation volume of the pigment and the type of adhesive to give a product having optimum receptivity properties at a minimum cost.

The maximum amount of adhesive again will depend upon the particular adhesive employed as well as the relative sedimentation volume of the pigment being used. As stated above, as the relative sedimentation volume value increases it becomes necessary to use more adhesive to obtain adequate bond of the pigment to the paper. This is one of the reasons for the maximum relative sedimentation volume value requirement of 6 required with respect to this invention since the use of a pigment dispersion having a relative sedimentaion volume value of above about 6 generally requires too much adhesive to obtain an adequate bond of the pigment to the paper and results in a coating having predominanty the properties of the adhesive itself and in diminished receptivity properties imparted to the coating by the calcium carbonate pigment. Again, it is difficult to set forth specific figures with respect to the maximum amount of adhesive which can be or should be employed due to the differing adhesive powers of the various adhesives and to the different relative sedimenation volume values of the pigments which can be used according to this invention.

A generally acceptable pigment-adhesive ratio has been found to be between 7:1 and 2:1 although, as stated above, these ratios may be broader or narrower depending upon the particular variables discussed above. Generally, a pigment-adhesive ratio of 4:1 seems to be most advantageous, especially with respect to pigments dispersed to relative sedimentation volume values of about 4 and higher, and when casein is used as the adhesive.

The solids content of any particular coating composition can vary quite widely as will be appreciated by those skilled in the art depending upon the particular process by which it is applied to the paper base, the coat weight desired, the type of adhesive and the amount thereof employed as well as the final properties desired in the coated paper.

Coating compositions having a solids content of from 10 to 60 percent have been prepared and coated on papers. The coating compositions can be applied to the paper by a variety of known coating procedures including reverse roll, trailing blade, and air knife coaters. When using an air knife coater, it has been found to be advantageous to employ a coating composition having a solids content of between about 25 and 30 percent. When using a reverse roll coater or applying the coating by means of a size press, considerably lower solids content compositions can be used. When using a trailing blade coater, higher solids content compositions are desirable, i.e., in the range of between 45 and 60 percent.

The liquid in which the calcium carbonate pigment can be dispersed is preferably water. Alkalinity of the liquid dispersion should be maintained for the successful practice of this invention. Particularly, in the case of protein adhesives such as casein, the coating composition must be alkaline since this condition is necessary to retain the proteins dissolved in water. In general, pH readings of 7 and above should be maintained. The calcium carbonate can also be dispersed in a solvent and the solvent composition coated on various paper bases. Various solvents can of course be used, as will be known to those skilled in the art, including methanol, isopropyl alcohol, butyl alcohol, and ethylene glycol monoethyl ether. The particular solvent used will of course depend mainly upon the particular adhesive or resin being used.

Coating weights can be varied as desired depending upon the coating method employed and the coat weight desired. Coat weights of .74 to 9.4 pounds per ream have given good results, although coat weights of around 3 to 6 pounds per ream appear to be preferable.

Various other materials can be added to and used in preparing the coating dispersions according to this invention to aid in dispersing and mixing the same, as will be appreciated by those skilled in the art. It is helpful to have a dispersing agent present during the preparation of the pigment dispersion. The presence of the surface active agent has been found to have little effect on the resulting relative sedimentation volume produced under comparable conditions. It is also advantageous at times to employ surface active agents in the preparation of the adhesive as well as solubilizing agents to place or maintain the adhesive in solution such as the use of alkaline agents for solubilizing casein as known in the art.

*Example 1.*—55 pounds of a calcium carbonate pigment marketed by Wyandotte Chemicals Corp. under the trade name "Purecal O" were mixed together with 28.8 pounds of water and 1.08 pounds of sodium hexametaphosphate (Calgon). The sodium hexametaphosphate was first added to the water and the calcium carbonate slowly added during agitation. The pigment dispersion was then agitated in a Lightnin' mixer for 30 minutes and the relative sedimentation volume determined in the manner specified above to be about 2.

34.45 pounds of the above pigment dispersion having a relative sedimentation volume of about 2 were then mixed together with a previously prepared adhesive solution containing 37.5 pounds of a 15 percent casein solution in water and 0.4 pound of a ketone formaldehyde resin marketed by Reichhold Chemicals, Inc. under the trade name "Beckamine 468–70" together with 35.5 milliliters of an ethylene oxidepolypropylene glycol marketed under the trade name "Pluronic L–62" by Wyandotte Chemicals Corp.

After the mixture was completed it was diluted with 25 pounds of water and homogenized at 5,000 pounds per square inch. The resulting coating had a solids content of 29.9 percent.

The coating composition was then applied to a raw stock paper base having characteristics similar to registered bond paper by means of an air knife coater to a coat weight of about 3 pounds per ream. The coating composition was dried at a temperature of between 250 and 275° F.

*Example 2.*—41.2 pounds of calcium carbonate pigment marketed by C. K. Williams & Co. under the trade name "Albacar 5970" were dispersed throughout 57.6 pounds of water previously mixed with 0.62 pound of sodium hexametaphosphate (Calgon). The calcium carbonate dispersion was then placed in a Lightnin' mixer and agitated therein for a period of 30 minutes. The relative sedimentation volume was then determined to be 4.14 by the method and formula described above.

An adhesive mixture containing 50 pounds of a 15 percent casein solution. 0.67 pound of a ketone formaldehyde resin ("Beckamine"), and 60 ml. of "Pluronic L–62" was then prepared and mixed together with 89.3 pounds of the calcium carbonate dispersion having the relative sedimentation volume value of 4.14 prepared above. 60 pounds of water were then added to the coating composition to bring the percent solids to 26.9 and the solution homogenized at 5,000 pounds per square inch. The resulting coating composition was then applied to a raw stock paper having properties similar to register bond paper by means of an air knife coater in a coat weight of 3 pounds per ream and dried at about 250–275° F.

Examples 1 and 2 illustrate the different relative sedimentation volumes which can be obtained using the same type of mixer at the same speed, at the same temperature, and over the same period of time, depending upon the particular calcium carbonate employed as well as the amount of carbonate dispersed in water.

*Example 3.*—1800 pounds of a calcium carbonate pigment ("Albacar 5970") were admixed with 4200 pounds of water containing 22.6 pounds of sodium hexametaphosphate (Calgon). The pigment mixture was then placed in a Cowls dissolver and agitated therein at 2000 r.p.m. for 5 minutes. The relative sedimentation volume value was measured in the manner set forth above as 5.

3000 pounds of the above pigment slurry were then mixed together with a sufficient amount of a solubilized casein adhesive to give a coating composition containing 25.1 percent solids.

The resulting coating composition was then applied to a raw stock paper base having properties similar to register bond paper with a coat weight of 3 pounds per ream by means of an air knife coater and dried at a temperature of between 250 and 275° F.

*Example 4.*—24 pounds of calcium carbonate ("Albacar 5970") were dispersed in a mixture of 12 pounds of ethyl cellulose and 88 pounds of methanol in a Kady mill until the calcium carbonate dispersion had a relative sedimentation volume of approximately 4. The coating composition was then applied to a suitable paper base and allowed to dry.

*Example 5.*—40 pounds of calcium carbonate ("Albacar 5970") were dispersed in a Kady mill with 60 pounds of butyl alcohol, 49 pounds of isopropyl alcohol, and 21 pounds of ethylene glycol monoethyl ether ("Cellosolve") until the dispersion of calcium carbonate obtained a relative sedimentation volume of about 4. 25 pounds of zein were then thoroughly dissolved in 70 pounds of isopropyl alcohol and 30 pounds of "Cellosolve" together with 25 pounds of a 40 percent solid dispersion in sodium hydroxide and ammonium hydroxide of a mixture of modified rosin, marketed under the trade name "Dresinol 210B." The calcium carbonate dispersion as prepared above was then mixed with the adhesive and coated on a raw stock paper having properties similar to registered bond and dried.

The coated papers as produced in the above Examples exhibited excellent receptivity to carbon and aniline dye transfer coatings especially when used for making multiple copies. The papers also exhibited excellent receptivity to special hectographic transfer coatings and could also be used as hectograph master sheets to produce hectograph copies having improved image quality. The papers showed improved receptivity to transfer coatings containing wax, oil, and synthetic resin or plastisol base coatings containing various pigments such as carbon and dyes such as aniline dyes.

The coatings applied to the papers according to this invention can be lightly calendered if desired. It is preferable to calender by means of a cotton roll, if calendering is felt to be necessary, just enough to slightly improve the smoothness of the paper. Calendering of the paper tends to decrease or completely eliminate the advantageous receptive properties of the coated papers and extreme care should be used. Ordinary calendering should be avoided.

We claim:

1. A paper coating composition consisting essentially of calcium carbonate having a relative sedimentation volume of between about 2 and 6 in admixture with an adhesive and a dispersing liquid, said composition containing sufficient adhesive to bond the pigment to a paper base and sufficient pigment to impart to a coating prepared from such composition to predominantly possess the character of the pigment rather than that of the adhesive and containing a sufficient solids content of pigment and adhesive to be of a coatable consistency.

2. A paper coating composition of claim 1 in which the calcium carbonate contains small quantities of other pigments.

3. A paper coating composition consisting essentially of a liquid dispersion of calcium carbonate having a relative sedimentation volume of between about 2 and 6 in admixture with an adhesive, said composition having a pigment-adhesive ratio of between about 7:1 and 2:1 and having a solids content of between about 10 and 60 percent.

4. A paper coating composition of claim 3 in which the calcium carbonate contains small quantities of other pigments.

5. The composition of claim 1 in which the liquid is water.

6. The composition of claim 5 in which the adhesive is casein.

7. The composition of claim 3 in which the liquid is water.

8. The composition of claim 7 in which the adhesive is casein.

9. The composition of claim 1 in which the liquid is an organic solvent.

10. The composition of claim 3 in which the liquid is an organic solvent.

11. A coated paper having improved transfer coating image receptivity comprising a base paper coated on at least one side with a dry composition consisting essentially of a calcium carbonate pigment and an adhesive, said coating containing sufficient adhesive to bond the pigment to the paper base and sufficient pigment to impart to the coating predominantly the character of the pigment rather than that of the adhesive, said calcium carbonate having a relative sedimentaion volume of between about 2 and 6.

12. The coated paper of claim 11 in which the pigment-adhesive ratio is between 7:1 and 2:1.

13. The coated paper of claim 11 in which the adhesive is casein.

14. A hectograph master sheet having improved transfer coating image receptivity comprising a base paper coated on at least one side with a dry composition consisting essentially of a calcium carbonate pigment and an adhesive, said coating containing sufficient adhesive to bond the pigment to the paper base and sufficient pigment to impart to the coating predominantly the character of the pigment rather than that of the adhesive, said calcium carbonate having a relative sedimentation volume of between about 2 and 6.

15. The hectograph master sheet of claim 14 in which the pigment adhesive ratio is between about 7:1 and 2:1.

16. The hectograph master sheet of claim 15 in which the base paper is translucent.

17. A duplicating master sheet having an improved transfer coating image comprising a base paper coated on at least one side with a dry composition consisting essentially of a calcium carbonate pigment and an adhesive, said coating containing sufficient adhesive to bond the pigment to the paper base and sufficient pigment to impart to the coating predominantly the character of the pigment rather than that of the adhesive, said calcium carbonate having a relative sedimentation volume of between about 2 and 6, and said image being present on the surface of the calcium carbonate coating.

18. A carbon image receptive tabulating card comprising a card stock base sheet, said base sheet coated on at least one side with a coating comprising a base paper coated on at least one side with a dry composition consisting essentially of a calcium carbonate pigment and an adhesive, said coating containing sufficient adhesive to bond the pigment to the paper base and sufficient pigment to impart to the coating predominantly the character of the pigment rather than that of the adhesive, said calcium carbonate having a relative sedimentation volume of between about 2 and 6.

References Cited in the file of this patent

UNITED STATES PATENTS

| | | |
|---|---|---|
| 1,209,222 | Statham | Dec. 19, 1916 |
| 1,374,112 | Rafsky | Apr. 5, 1921 |
| 2,163,958 | Neidich | June 27, 1939 |
| 2,351,683 | Hughes et al. | June 20, 1944 |
| 2,395,992 | Clark | Mar. 5, 1946 |
| 2,582,932 | Lustbader | Jan. 15, 1952 |
| 2,974,585 | Newman | Mar. 14, 1961 |
| 2,995,468 | Steiger | Aug. 8, 1961 |